(12) United States Patent
Boys

(10) Patent No.: US 6,810,598 B2
(45) Date of Patent: Nov. 2, 2004

(54) TEMPLATE SYSTEM FOR LOCATING AND CUTTING WALL OR CEILING OPENINGS

(76) Inventor: Mark A. Boys, 380 Carpenteria Ave., Aromas, CA (US) 95004

( * ) Notice: Subject to any disclaimer, the term of this patent is extended or adjusted under 35 U.S.C. 154(b) by 0 days.

(21) Appl. No.: 10/283,943

(22) Filed: Oct. 29, 2002

(65) Prior Publication Data
US 2004/0078990 A1 Apr. 29, 2004

(51) Int. Cl.[7] .............................................. G01B 21/00
(52) U.S. Cl. ...................... 33/528; 33/562; 33/DIG. 10
(58) Field of Search ........................ 33/562, 563, 565, 33/566, DIG. 10, 783, 784, 791, 792, 793, 794, 832, 833, 451, 452, 464, 528

(56) References Cited

U.S. PATENT DOCUMENTS

| | | | | |
|---|---|---|---|---|
| 3,939,564 A | * | 2/1976 | Slawinski, Sr. ............... | 33/452 |
| 4,285,135 A | * | 8/1981 | Minozzi, Jr. .................. | 33/528 |
| 4,700,489 A | * | 10/1987 | Vasile .......................... | 33/451 |
| 5,148,108 A | * | 9/1992 | Dufour ......................... | 33/451 |
| 5,222,303 A | * | 6/1993 | Jardine ......................... | 33/528 |
| RE34,374 E | * | 9/1993 | Davidson ...................... | 33/566 |
| 5,692,357 A | * | 12/1997 | McCain ........................ | 33/528 |
| 5,813,130 A | * | 9/1998 | MacDowell ................. | 33/528 |
| 5,860,219 A | * | 1/1999 | Wilkinson .................... | 33/528 |
| 6,082,017 A | * | 7/2000 | Simar ........................... | 33/755 |
| 6,396,433 B1 | * | 5/2002 | Clodfelter .................... | 342/22 |
| 6,463,668 B1 | * | 10/2002 | Williams ...................... | 33/528 |
| 6,502,319 B1 | * | 1/2003 | Goodrich et al. ............. | 33/286 |
| 6,553,683 B1 | * | 4/2003 | Klass et al. ................... | 33/562 |

* cited by examiner

Primary Examiner—G. Bradley Bennett
Assistant Examiner—Madeline Gonzalez
(74) Attorney, Agent, or Firm—Donald R. Boys; Central Coast Patent Agency, Inc.

(57) ABSTRACT

A template system for guiding drywall cutouts has at least one control box incorporating a stud-finder, and a system of interconnecting extensions attached to the control box, the extensions forming a predetermined geometrical shape. The template system is characterized in that, with the template system positioned against a drywall, individual edges of the interconnecting extensions serve as guides for a cutting tool to cut out a portion of the drywall in the predetermined geometrical shape formed by the interconnecting extensions.

9 Claims, 9 Drawing Sheets

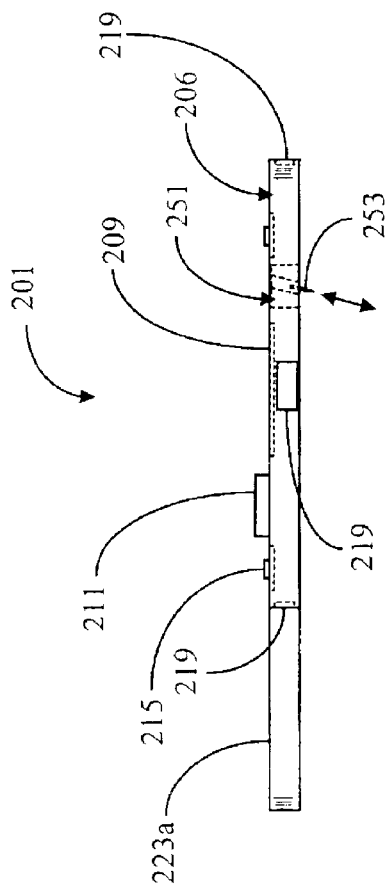
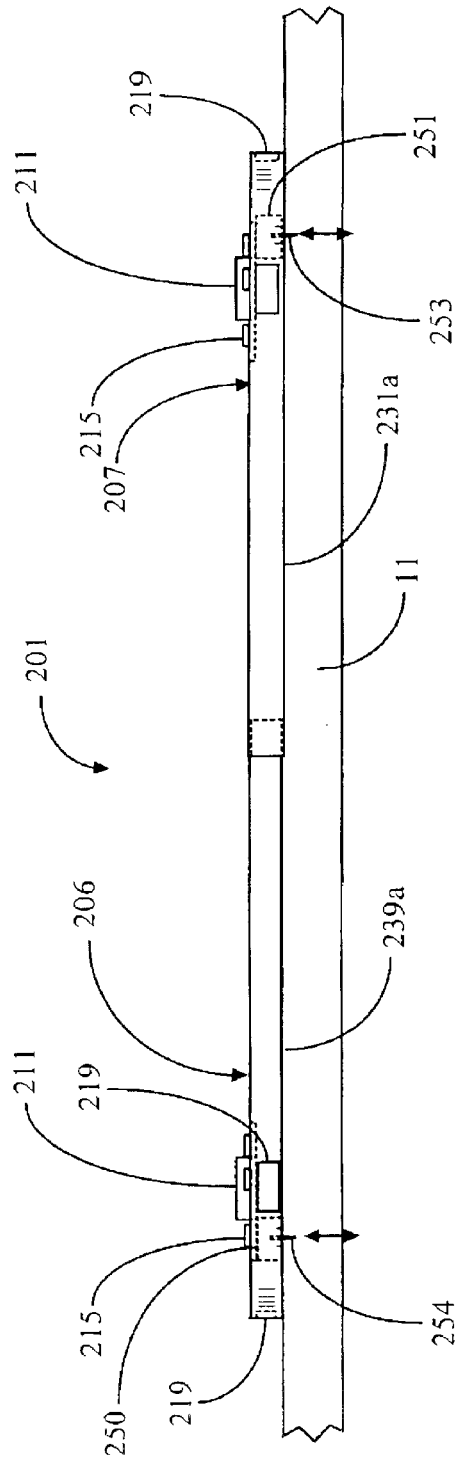
Fig. 2B
Fig. 2C

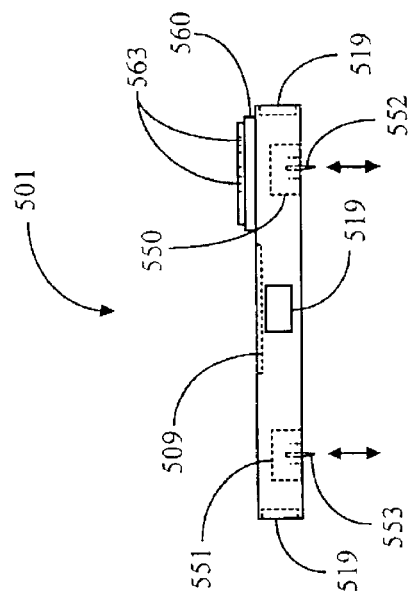
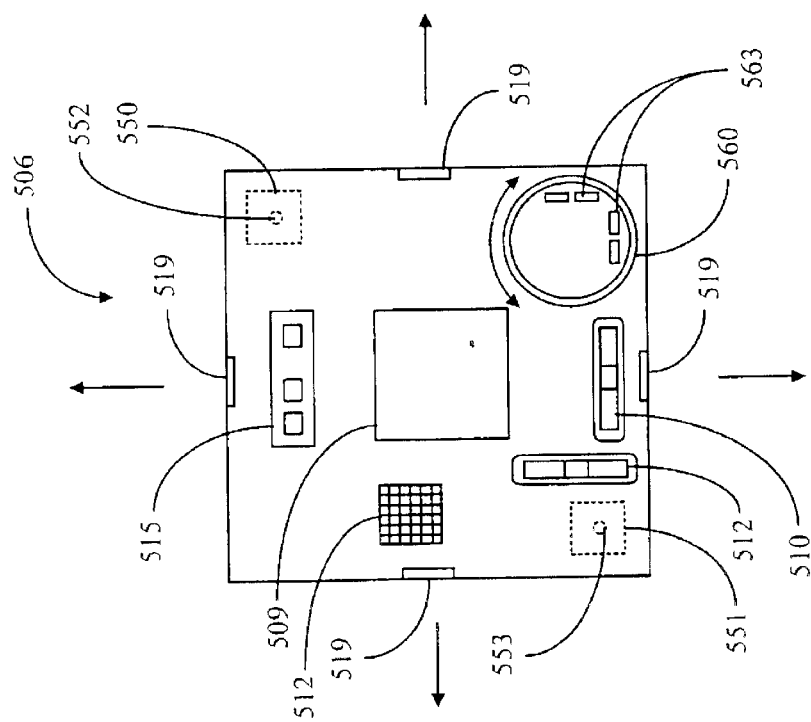
Fig. 5B
Fig. 5A

TEMPLATE SYSTEM FOR LOCATING AND CUTTING WALL OR CEILING OPENINGS

FIELD OF THE INVENTION

The present invention is related to commercial or residential electrical wiring and component installation, and pertains more particularly to a template system for locating and cutting gang openings for installing stud-mounted "old work" electrical gang boxes. The invention is further directed to a template system for easily locating and cutting other openings of various sizes in a wall, ceiling or other surface.

BACKGROUND OF THE INVENTION

Wiring and other components for electrical, networking or other such systems in a residential or commercial structure is installed utilizing either "new work" or "old work" installation techniques. The term "new work", such as when used with reference to installing wiring and components in new home construction, refers to installation of the wiring and components wherein the wiring and components are routed through and installed within the framing of the structure prior to installation of the drywall wall/ceiling covering. The term "old work" refers to the installation of additional wiring or components to existing wiring or components, or to existing wiring or components in an existing structure. A common "old work" example is the installation of an electrical gang box for a new electrical outlet along an existing wiring branch.

It is commonly required that in "old work" installation and repair, at least a portion of the wall covering, typically being drywall, be removed to allow access to, or installation of the wiring or components. Particularly, for installation of electrical gang boxes for installing a new electrical outlet, a rectangular-shaped opening is generally required to be cut from the drywall, and the opening must be level both horizontally and perpendicularly to a horizontal line. It is also desired in such "old work" gang box installation that the location of the new opening is in the desired position relative to a floor, wall or ceiling in the room were the new outlet is installed.

Typical "old work" gang box installation involves locating, scribing and cutting the opening from the existing drywall covering, and installing an "old work" gang box which attaches directly to the drywall, typically utilizing a screw-mounted tab which is rotated to secure behind drywall and a screw accessible from the front of the gang box. A variety of other such means for securing a gang box to drywall have been introduced in the art as well.

The majority of "new work" gang boxes installed in the framing of the structure, for instance, in new home construction, are firmly secured to a framing member of the structure, usually a vertical wall stud, prior to the installation of drywall. It is well-known in the art that, for obvious reasons of stability, rigidity and safety, it is preferable that the gang box be mounted to a stud or other secure member in the framing of the wall boxes, hence such installation in new home construction. In such an application the gang box, and thereby the electrical outlet secured to the gang box, is less prone to jarring or damage caused by contact between cord ends plugged into the outlet and other objects, such as furniture for example, or drywall damage due to over-tightening of the mounting screws. Stability is further compromised in a drywall-mounted gang box application when the drywall, for whenever reason be it moisture damage, or deterioration over time, becomes softer and less able to support and secure the gang box. A particular advantage in such stud-mount application is thereby gained over "old work" drywall-mounted gang boxes, which are typically made of plastic or other non-metal material, and are much more prone to damage compared to metal stud-mounted gang boxes.

For "old work" installation of a new outlet it is therefore preferable that the new outlet be located such that the gang box to which the new outlet is attached is securely fastened to a stud or other framing member within a wall or ceiling. The opening for the new outlet must therefore be not only square, level and located a specific distance from the floor or wall, but must also be located such that one vertical side of the opening is exactly aligned with, and adjacent to, a side surface of a vertical framing stud, for instance, for the purpose of mounting the gang box to the side of the vertical stud. If such a gang box opening is not perfectly located and aligned, upon securing the gang box to the stud, damage to the drywall may occur due to misalignment between the gang box and the opening, and may also adversely affect the alignment and attachment of the wall plate covering the outlet. Presently, such "old work" installation of stud-mounted electrical gang boxes is therefore most often, and best carried out by, those trained in the skill of the art.

Various "old work" methods and apparatus have been developed for locating, scribing and cutting openings in drywall for installation of stud-mounted gang boxes, utilizing such as electronic stud finders, contractor's levels equipped with bubble levelers, and hand-held templates for marking or scribing the wall with an outline of the desired opening. Many "old work" gang boxes are supplied with paper templates for marking the opening prior to cutting.

Much improvement, however, is still needed in the art to enable one with ordinary skill to accurately locate and cut an opening in drywall for a stud-mounted gang box installation. Present techniques require many separate steps and devices to accurately scribe and cut such an opening. The person of ordinary skill performing the installation must first locate the stud behind the drywall using such as an electronic stud finder, manually mark on the drywall the location of the edge of a vertical stud, and then utilize several other devices and means for locating, scribing and cutting the gang box opening such that it is square and level and closely aligned with the vertical framing stud to which it will be mounted.

Such methods for locating and scribing the opening, utilizing an electronic stud finder and carpenter's level or hand-held template, for instance, easily lend themselves to errors in scribing or cutting the opening, because of the manual nature of the actions. Great care must be taken to accurately mark perfectly level horizontal and vertical lines for the new opening. When utilizing a hand-held paper gang box opening template, accurate marking around the periphery of the paper template is often difficult and prone to error, and hand-held leveling templates utilizing such as spiral cutting tools, or roto-zip tools as they are often referred to as, are often difficult to manually hold stationary to drywall while cutting the opening with the cutting tool around the periphery of the template. When utilizing a hand-held drywall saw for cutting a scribed opening, great care must also be taken to avoid cutting into electrical or other wires or cables which may be located behind the cutting line, and unknown to the person performing the cut.

An inherent functional limitation in hand-held gang box opening templates is that the templates are typically available in sizes applicable to either a single-gang box opening, or a dual-gang opening, or in some instances, both. Such a hand-held template provides no advantage, however, to one wishing to easily cut a square and level opening of a size different from what is required for a standard single or dual gang box, such as for a junction box for wiring of a local area network (LAN), for instance. Slight variances in the dimensions of "old work" gang boxes may require openings having dimensions slightly different from standard, posing further problems to the user of a conventional hand-held gang box opening template.

What is clearly needed is an "old work" template system for accurately locating and cutting an opening in drywall or other such wall covering, wherein the user of average skill may accurately locate the position of the cut relative to a framing member within a wall, for example, and precisely cut a square and level opening of predetermined size from the drywall, the opening oriented such that it is properly positioned relative to the edge of the wall stud or framing member for subsequent mounting of a desired box. Such a template system should accurately pinpoint the location of the gang box mounting surface of a stud or framing member behind drywall, indicating to the user such alignment, enabling the user to then secure the template in the exact level position relative to the edge of the stud or framing member, and to accurately cut the desired opening along an outline of a predetermined size provided by the template. By utilizing such a template system in preferred and alternative embodiments the user is enabled to adjust the template horizontally and vertically so as to accurately cut square and level openings of various predetermined sizes, accurately positioned relative to a framing stud, floor, wall or ceiling, for example, or to accurately cut square and level openings in drywall, the openings having dimensions much larger, and of different shapes than are required for gang box installation. The template system of the present invention enables the user of average skill to repeatedly perform such precision cuts eliminating the need for several separate steps and devices for locating, measuring, scribing and cutting the opening, such as is required in conventional art. The system should also be inexpensive to manufacture utilizing many conventionally known methods and apparatus for leveling, stud location, distance measurement, opening measurement, and so on, and also be lightweight and easily handled, positioned or otherwise manipulated by a single user, allowing the user to easily reposition the template system in various orientations or positions for repeated cuts, while maintaining the template system level or perpendicular to a horizontally or vertically plumb line. Embodiments of such a new and novel template system are herein provided as described and illustrated below in enabling detail.

SUMMARY OF THE INVENTION

In a preferred embodiment of the present invention a template system for guiding drywall cutouts is provided, comprising at least one control box incorporating a stud-locator, land a system of interconnecting extensions attached to the control box, the extensions forming a predetermined geometrical shape. The template system is characterized in that, with the template system positioned against a drywall, individual edges of the interconnecting extensions serve as guides for a cutting tool to cut out a portion of the drywall in the predetermined geometrical shape formed by the interconnecting extensions.

In some preferred embodiments the predetermined geometrical shape is rectangular. Also in some embodiments the stud-finder incorporates a radar subsystem to locate a stud. In some embodiments individual ones of the interconnecting extensions are extensible to establish different lengths, such that the overall size of the predetermined geometrical shape may be adjusted. There may be lock/unlock mechanisms to fix lengths of extensions after adjustment.

In some embodiments the at least one control box further incorporates sensors to determine the dimensions of the predetermined geometrical shape, and an alert mechanism to inform a user of different dimensions. Also in some embodiments the at least one control box further comprises a memory system for a user to set one or more dimensions, and the alert mechanism alerts the user when adjustment of the dimensions of the extensions equals the set dimension or dimensions. The alert mechanism may be one or both of an audio alert or a light. In some cases the template system control box comprises a display, and displays dimensions of the predetermined geometrical shape.

In some preferred embodiments there are control boxes situated on opposite sides of the geometrical shape formed by the interconnecting extensions, each one of the control boxes comprising a stud finder. In some other embodiments there are four control boxes, each having a stud finder, and a system of interconnecting extensions, each extension pivotally attached at opposite ends of the extension to two of the four control boxes. The extensions may be attachable to and detachable from the control boxes.

In some cases the at least one control box comprises at least one sensor for determining distance from a wall or floor, and an alert system for informing a user at a predetermined distance. The at least one control box may further comprise a memory system for a user to set one or more distances, and wherein the alert mechanism alerts the user when the distance from the wall or floor equals a set distance. There also may be a level indicator system for indicating to a user when one or more extensions of the interconnecting extensions are level or plumb. The level indicator system may incorporate a magnetometer system. In addition there may be a mounting system for temporarily mounting the template system to a drywall.

In another aspect of the invention a method for making a cutout in a drywall is provided, comprising the steps of (a) placing a template system against the drywall, the template system having at least one control box incorporating a stud-finder and a system of interconnecting extensions attached to the control box, the extensions forming a predetermined geometrical shape; (b) moving the template system until positioned to a stud according to the stud finder; and (c) using individual edges of the interconnecting extensions as guides for a cutting tool to cut out a portion of the drywall in the size and predetermined geometrical shape. In some preferred embodiments the predetermined geometrical shape is rectangular.

In some embodiments of the stud-finder incorporates a radar subsystem to locate a stud. Further, individual ones of the interconnecting extensions may be extensible to establish different lengths, such that the overall size of the predetermined geometrical shape may be adjusted, and the method further comprises a step for adjusting the lengths. There may also be lock/unlock mechanisms to fix lengths of extensions after adjustment, and the method may further comprise a step for using the lock/unlock mechanisms in the adjustment.

In some cases the control box further incorporates sensors to determine the dimensions of the predetermined geometrical shape, and an alert mechanism to inform a user of different dimensions. There may be a memory system for a user to set one or more dimensions, and the alert mechanism may then alert the user when adjustment of the dimensions of the extensions equals the set dimension or dimensions. The alert mechanism may be one or both of an audio alert or a light.

In some embodiments control box comprises a display, and displays dimensions of the predetermined geometrical shape. Further, there may be two control boxes situated on opposite sides of the geometrical shape formed by the interconnecting extensions, each one of the control boxes comprising a stud finder.

In some embodiments of the method there are four control boxes, each having a stud finder, and a system of interconnecting extensions, each extension pivotally attached at opposite ends of the extension to two of the four control boxes. The extensions in these embodiments may be attachable to and detachable from the control boxes. There may further be at least one sensor for determining distance from a wall or floor, and an alert system for informing a user at a predetermined distance. There may be a memory system for a user to set one or more distances, wherein the alert mechanism alerts the user when the distance from the wall or floor equals a set distance.

In some embodiment of the method a level indicator system for indicating to a user when one or more extensions of the interconnecting extensions are level or plumb is provided and used for setting the template level and plumb. The level indicator system may incorporate a magnetometer system. There may also be a mounting system for temporarily mounting the template system to a drywall.

In embodiments of the present invention taught in enabling detail below, for the first time a template system is provided that very quickly and efficiently locates cutouts in drywall, and guides a cutting tool in making the cutouts.

BRIEF DESCRIPTION OF THE DRAWINGS FIGURES

FIG. 2B is an end view of the template system of FIG. 2A.

FIG. 2C is a top view of the template system of FIG. 2A, and the drywall of FIG. 1.

FIG. 5A is an elevation view of a template system module according to yet another alternative embodiment of the present invention.

FIG. 5B is a side view of the template system module of FIG. 5A.

DESCRIPTION OF THE PREFERRED EMBODIMENTS

Figure 1:
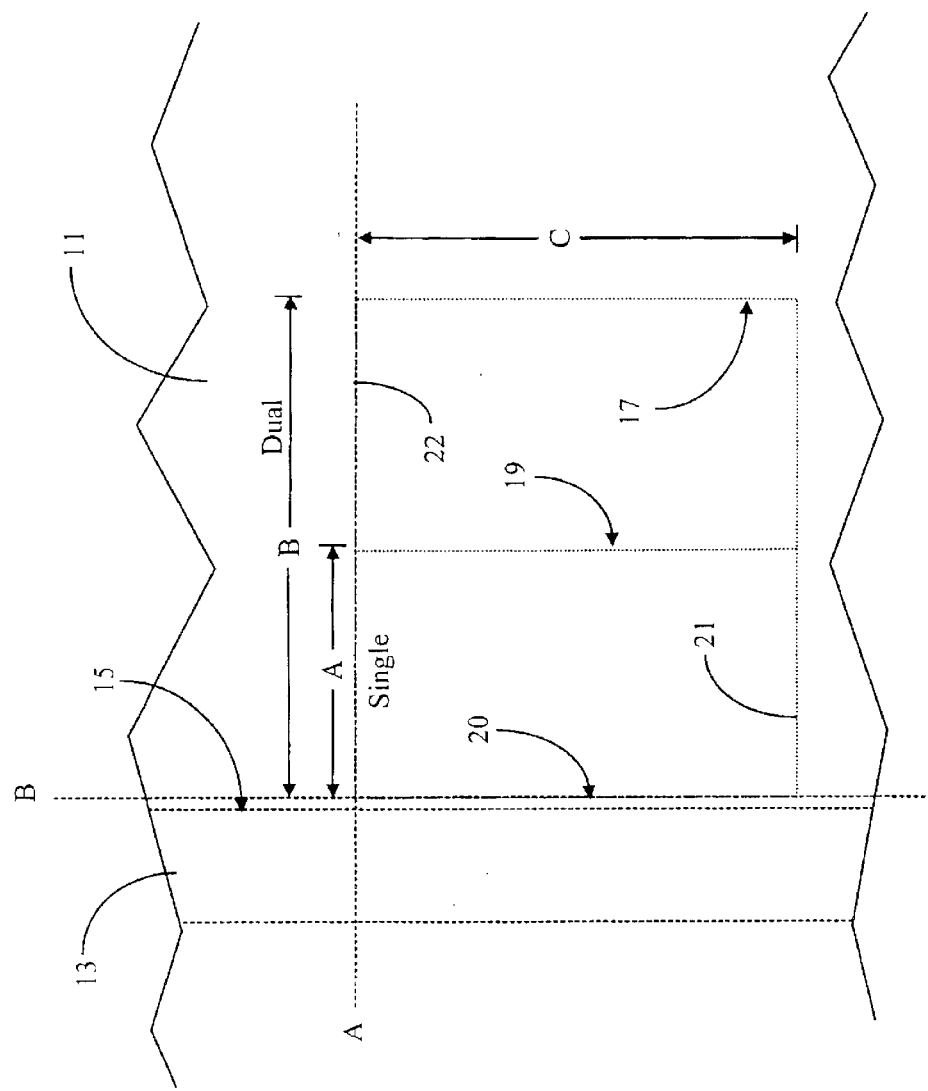
FIG. 1 is a broken elevation view of a section of drywall with an outline of a single and a dual gang box opening scribed thereupon, and a framing stud.

FIG. 1 illustrates an outline for an opening to be cut into a section of drywall, for both a single and a dual gang box opening, located adjacent to, and aligned with a vertical framing stud within a wall, to which a gang box is to be mounted. Drywall 11 covers stud 13 as is typical in the construction of a wall. Typically the outline of a rectangular cutout for a gang box is marked or scribed upon the outer surface of drywall 11, in a preferred position for installing either a single or dual gang box to stud 13. In order for proper alignment of the newly installed gang box, the left vertical edge of the cutout outline, represented by line 20 in the illustration, is adjacent to, and aligned with the right vertical edge of stud 13, represented as surface 15. In the illustration an outline for the cutout required for a single-gang opening is represented by the rectangular shape formed by line 19 intersected by lines 21 and 22, the rectangular outline having a width of dimension A and height of dimension C. The dual gang opening is approximately twice the width of the single gang opening described above, represented by line 17 intersected by lines 21 and 22, the dual-gang outline having a width represented by dimension B, and sharing the height of dimensions C with the single-gang opening outline.

It is well known in the art that not in all situations will stud 13 be perfectly level with a vertical line, as is illustrated in FIG. 1. It is preferred, however, when cutting the outline of the gang box opening, that the opening be as close to perfectly square as possible, and also is oriented such that the top and bottom horizontal edge of the opening is level to horizontal (line A), and the left and right vertical edges of the opening are plumb and perpendicular to the horizontal line.

In order to achieve the square and level gang box opening cutout of FIG. 1 for mounting a single or dual gang box to stud 13, stud 13 must first be accurately located through drywall 11 for the purpose of properly positioning the reference point for beginning the marking or cutting, or for correctly positioning a hand-held template for marking or cutting. The location for the reference point for the cutout must be determined relative to surface 15 of stud 13. In the illustration such a reference point may be the intersection of horizontal line A with vertical line B.

In conventional art there are many method steps and different devices required for determining the exact location of stud 13, and marking the reference point for the outline for the cutout so as to enable the desired square and level cutout, correctly positioned relative to stud 13. An electronic stud finder device, for example, may be used to locate the approximate location of surface 15 of stud 13, a mark made on drywall 11 indicating the location, and then various other separate means and methods for measuring and scribing or cutting along the desired outline are generally required as discussed above.

Figure 2A:
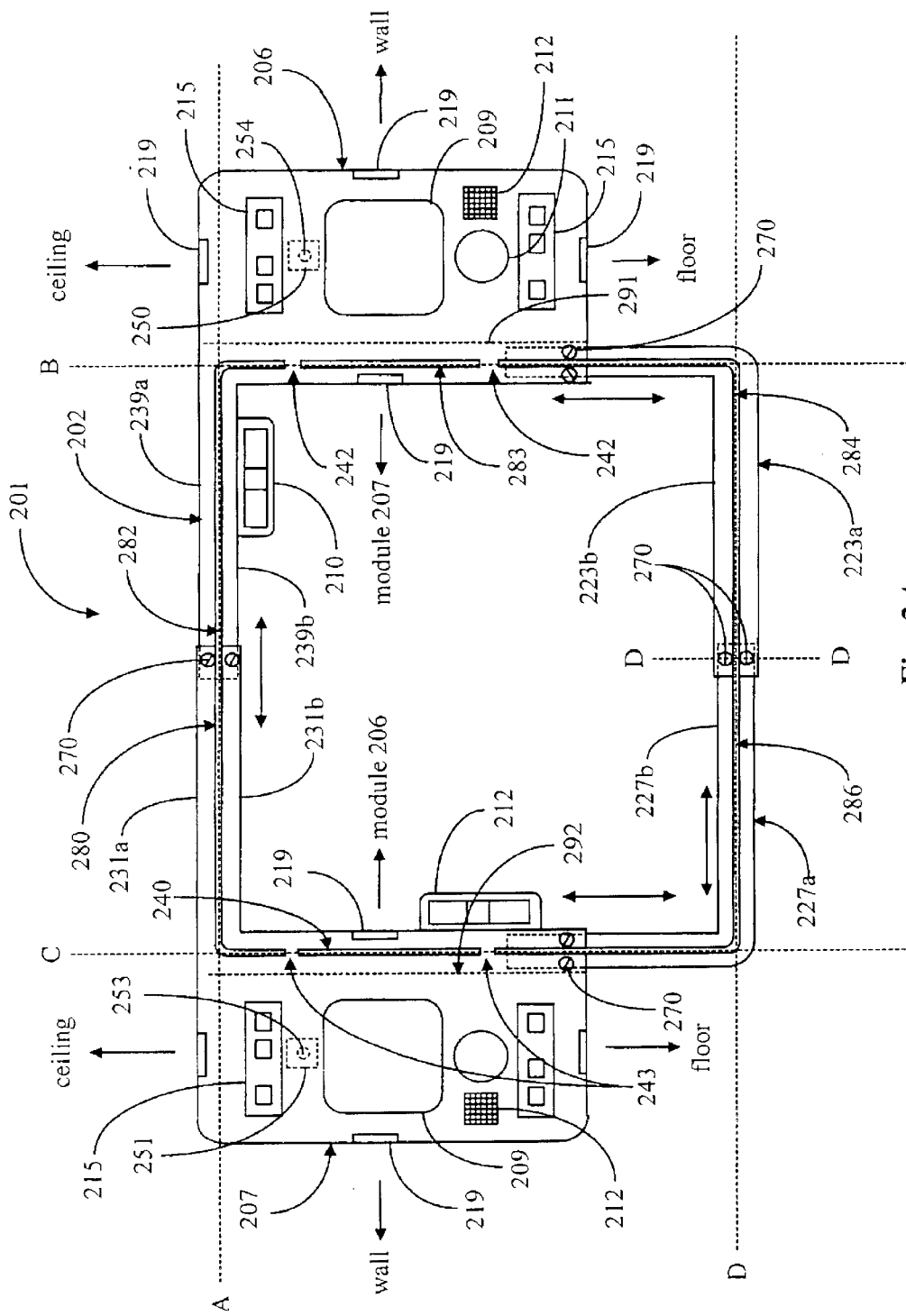
FIG. 2A is an elevation view of a template system for locating and cutting the gang box opening of FIG. 1 according to a preferred embodiment of the present invention.

FIG. 2A illustrates an improved template system enabled for locating and cutting such a square and level gang box opening properly positioned relative to a framing stud to which a gang box will be attached, according to a preferred embodiment of the present invention. Template system 201 provides an adjustable template for cutting such an opening, enabling accurate location of an outline for a cutout of a predetermined width and height, the outline properly located relative to the location of a stud or other framing member within a wall, ceiling and so forth. Template system 201 enables the average user to easily and affordably perform "old work" stud-mounted gang box installation for new outlet additions to existing electrical wiring and components in a building structure.

Template system 201 in this embodiment comprises a pair of stud finder modules 206 and 207 and an adjustable template system 202 spanning between modules 206 and 207 for guiding a drywall cutting tool, particularly a rotary or spiral type cutting tool, over the outline for the cutout formed by the adjustable template system. Stud finder modules 206 and 207 each contain stud-sensing circuitry according to known technology, preferably utilizing the latest mini-radar sensing technology for accurately reading the exact dimensions and location of the framing stud. In this respect stud finder modules 206 and 207 are functionally equivalent.

Each of module 206 and 207 has a display 209 utilizing known display technology such as LCD or equivalent, for providing the user with visible readings, information and possibly graphics pertaining to the operation and positioning of template system 201. Each of modules 206 and 207 also has a speaker 212 for providing the user with various audible indicators. Buttons 215 and rotary knob 211 are provided for each of modules 206 and 207 for executing the various functions of modules 206/207, which are further described below, and for selecting display of various information and settings pertaining to the modules' operation and function.

Each of modules 206 and 207 is also provided with a plurality of emitter/receiver elements 219, one element 219 located on each of the top, bottom, left and right sides of modules 206/207. Elements 219 are connected to circuitry and a processor (not shown) within modules 206/207 enabled for emitting, receiving, reading and processing laser signals. In a preferred embodiment, elements 219 are enabled for laser distance measurement utilizing known technology such as CCD laser displacement sensing that is suitable for measuring the distance between, for example, the inside edges of each module 206/207 utilizing the inside-facing elements 219, or between a top or side edge of module and a wall, ceiling, floor, and so on. The functions of each of elements 219 are separately programmable through activation of one or more of buttons 215 or knob 211.

The unique template system of the present invention combines the functions of stud location, distance measurement and leveling with an adjustable template system enabling an accurate cut along a precise outline of a predetermined size for a cutout. Modules 206 and 207 each have, extending outwardly and horizontally from the top of each module, a pair of extension arms which fit together to form the top outline of the template, represented by horizontal line A. Module 206 has extension arms 239a and 239b and module 207 has arms 231a and 231b. Extension arms 239 and 231 particular nature, the outer shape of each being somewhat rectangular with a smooth, flat top surface, and are integrated with the body of modules 206 and 207 in a preferred embodiment, or may otherwise be fixedly attached to the body of modules 206/207 using various know means.

Extension arms 231 and 239, and the outer casing of modules 206/207 are preferably formed of high-strength metal alloy that is both rigid and lightweight. The inside dimension of each of tubular arms 231 are slightly larger than the outside diameter of arms 239, such that the ends of each of arms 239 may be inserted into the ends of arms 231. Arms 231 are adapted to receive the ends of arms 239, allowing arms 239 to slide within arms 231, thereby providing horizontal adjustability to the template system. It is shown in the view that the ends of arms 239 extend slightly into arms 231, and are secured once the proper adjustment has been achieved utilizing such as set screws 270, or, in alternative embodiments, a variety of other known clamping means. In the embodiment shown, screws 270 extend through, and rotate freely within threaded holes at the end of arms 231, and upon tightening, urge into the top surface of arms 239, thereby securing arms 239 within arms 231.

The lower portion of template 202 comprises a pair of L-shaped extensions 223a/b, and 227a/b, each of which is also tubular in nature, similarly to extension arms 231 and 239 of modules 207 and 206. The inside dimensions at the ends of tubular extensions 223 are slightly larger than the outside dimensions of extensions 227, such that extensions 227 may be inserted into the ends of extensions 223, and may slide back and forth within extensions 223, similarly to extensions 231 and 239 of modules 207 and 206. Screws 270 are used in this embodiment as described above for extension arms 231 and 239 for securing arms 227 within arms 223 once the proper horizontal adjustment has been achieved.

Each of modules 206 and 207 are provided with an internal track (hidden view) located along the inside vertical edge of each module, adapted for receiving the upper end of each L-shaped extensions set 223 and 227, and allowing the upper portion of arms 223 and 227 to slide up and down within the vertical tracks. The upper ends of arms 223 extend up into track 291 of module 206 and are secured within track 291 once the proper vertical adjustment has been achieved, utilizing additional screws 270. The upper ends of arms 227 extend into the bottom of module 207 via track 292, similarly to arms 223, and are also secured within track 292 utilizing a set of screws 270.

The rectangular outline of a cutout to be made, in this case for a gang box opening, is represented in this view by the area within template 202 formed with the intersection of horizontal lines A and D, with vertical lines B and C. It is the object of the present invention as shown in the illustration, to enable the user, using a rotary-type or a reciprocating cutting tool, to easily follow a guideline with the cutting tool for cutting exactly along the desired outline of the cutout. Such a guide for the cutting tool is provided in this embodiment by assembling and securing arms 239 with arms 231, and securing arms 223 and 227 together, and securing the upper ends of each into modules 206 and 207.

An L-shaped slot 280 is formed between the separate extending arms 231a and 231b of module 207, and a similar slot 282 is formed between arms 239a and 239b of module 206, the slots extending completely through each extending arm set such that the cutting bit of a cutting tool may be inserted through the slot and may move within the slot, for making a cut along the outline. Slots 281 and 282 form the upper portion of the outline of the desired cutout as shown in the illustration. A similar pair of L-shaped slots 284 and 286 are formed by the attachment of arms 223 and 227 to each other and into modules 206 and 207 as described, together forming, as shown in the illustration, the lower portion of the outline of cutout. Module 206 has a vertical slot 283 which extends completely through the body of module 206, and is aligned along the left side of module 206 with the vertical portions of L-shaped slots 282 and 284, following vertical line B as shown. Module 207 has an equivalent vertical slot 240 located on the right side, aligned with the vertical portions of L-shaped slots 280 and 286. Together, slots 280, 282, 284 and 286 formed by extension arms 231/239 and 223/227, and vertical slots 283 and 240 of modules 206 and 207, form a substantially continuous rectangular-shaped guide for a cutting tool, such that the user, by following the guide provided by the combined slots, the user easily and accurately make the cutout along the outline formed by the area defined by lines A, B, the C and D.

In practice of the present invention, a user wishing to make a cutout in drywall for an opening for a stud-mounted gang box will first determine the size of the opening to be cut, and adjust the size of template 202 horizontally and vertically as described previously, securing the elements of template 202 in the desired position by tightening all of screws 270. In a preferred embodiment modules 206 and 207 are enabled for determining the vertical and horizontal dimensions of the outline formed by the position of elements of template 202. Modules 206 and 207 in a preferred embodiment are enabled with programming intelligence and circuitry to determine the width dimension of the outline formed by lines A, B, C and D, as shown in the illustration, by detecting the positions of upper extension arms 231 and 239 relative to each other, and by detecting the positions of lower extension arms 223 and 227 within tracks 291 and 292 of modules 206 and 207 respectively.

Modules 206 and 207 are further enabled with circuitry and functionality (not shown) for communicating with one another, either through wired connection through the extension arms of template 202, or via wireless infrared communication such as is commonly known, or both. Module 206, for example, may determine the dimensions of an outline based on the sensed positions of all of the extending arms relative to each other and the position of arms 223 and 227 in tracks 291 and 292, or may combine the sensed position of arms 223 and 227 with a laser distance measurement through the inward-facing elements 219. Intercommunication between modules 206 and 207 enables each module to sense the other module's positions of extension arms relative to each other, and locations within tracks 291 and 292 of the extension arms 223 and 227, with the ability to share this information between them. Either module 206/207, may therefore display through display 209, initiated by activating one of buttons 215, for example, the determined dimensions of the outline formed by template 202.

By utilizing such detection functionality for determining the dimensions of an outline formed by template 202, modules 206/207 may then compare the dimensions of the outline with a dimension that has been pre-programmed into the intelligence of modules 206/207, such as the standard dimensions for a single-gang and dual-gang outlet box cutout, for example, and provide the user with a visual indicator through a display 209, or an audible indicator through speaker 212, or both, when such a known dimension is achieved by the adjustment of template 202.

A preferred embodiment of the invention also enables a user, utilizing one or more of buttons 215 to enter into memory (not shown) within modules 206 or 207, the exact dimensions of a particular cutout, such that the dimension is saved in memory for recall at a later time. Other means for a user entering such dimension information into modules 206 or 207 may include placing template system 201 upon a printed outline supplied by the manufacturer with a new "old work" gang box, for example, aligning the slot of template 202 with the outline for the cutout, and then, utilizing one or more of buttons 215, initiating functionality for determining the dimensions of the outline based on the positions of the extension arms, as previously described. A user may then select from memory within modules 206/207, by utilizing rotary knob 211, for example, various dimensions for different cutouts, and then adjust template 202 to match a selected dimension, and receive a visual and/or audible indication from module 206/207 when such a dimension is achieved. Various embodiment of invention may also utilize measurement marks, which may be placed at various locations of the extensions of template 202 or modules 206/207, providing the user with a quick visual reference indicating the dimensions of the outline.

Modules 206/207 of template system 201 are enabled for laser distance measurement through elements 219 for determining the distance between a calculated reference point and a wall, a ceiling or a floor, as well as the distance between the inward-facing elements 219 of modules 206 and 207. Intelligence built into the distance sensing functionality of modules 206/207 may calculate, for example, the distance between the floor and the starting reference point for the cutout, and display the information through display 209. A predetermined measurement, such as a minimum required distance between the floor and outlet box according to building code, may be pre-programmed into memory of modules 206/207, and modules 206/207 may then give a visual/audible indicator when template system 201 is positioned on a wall at the proper height such that the lower border of the outline for the cutout, represented as line D in FIG. 2A, is at the proper distance from the floor as detected by the laser distance measurement functionality.

Template system 201 is also provided with a pair of levels 210 and 212, level 210 located horizontally on the upper inner surface of arm 239b of module 206, the other located vertically along the inside edge of module 207. The user is thereby provided a quick visual indication of whether or not the template is positioned on the wall squared to a horizontal line. In a preferred embodiment modules 206 and 207 are also provided with detecting means (not shown), which detect the status of each level and may then provide a visual indicator through display 209 of the current angle of template system 201 relative to plumb, for example, or may also provide a visual and/or audible indicator when such alignment is achieved. In one embodiment the system uses a magnetometer system for determining level.

Once the dimension of the cutout is determined and template 202 has been adjusted by the user to exactly match said dimension as described above, the exact location for the cutout is then determined utilizing the stud-sensing functionality of either module 206 or 207, depending on whether the cutout will be located to the right or left of a stud within the wall. For the example given the starting reference point for a cutout that is to be located to the right of the wall stud, will be the intersection of lines A and C, the starting reference point for an opening to be located to the left of a wall stud, being the intersection of lines A and B. Either starting reference point is preferably located adjacent to the left or right side of the wall stud as applicable, as shown in the example given by FIG. 1, illustrating the intersection of lines A and B, located adjacent to surface 15 of stud 13.

Utilizing the stud sensing functionality the user is enabled to locate template system 201 on the wall in the correct position relative to the stud, by receiving a visual/audible indicator from one of modules 206/207 when proper alignment is achieved, and the starting reference point of the outline for cutout is in the correct position relative to the wall stud. The user may then move template system 201 up or down in alignment with the wall stud until the predetermined distance is detected between the starting reference point for the cutout and the floor, at which point the user may also receive a visual/audible indicator from one of modules 206/207 that the correct distance has been achieved. Once the correct position of template system 201 relative to the wall stud, and correct distance from the floor has been achieved, the user may then rotate template system 201 to level the outline of template 202 to plumb, and also receive a visual/audible indicator from modules 206/207 when a perfectly level line has been achieved.

Module 206 has a locator pin mechanism 250 for the purpose of anchoring the right side of template system 201 in its held position over a wall stud after proper location and alignment has been achieved. Module 207 has an equivalent locator pin mechanism 251 for anchoring the left side. In the example described above for placing template system 201 on the drywall at the proper height, angle, and location relative to the wall stud, the user, upon achieving the correct template position for the proposed cutout, activates locator pin mechanism 251, which drives a pin 253 into the drywall at a downward angle, anchoring the left side of template system 201 to the drywall. The user then verifies that template 201 is level, and activates locator pin mechanism 250, which drives a pin 254 into the drywall at a downward angle thereby anchoring the right side of template system 201. Activation of pin mechanisms to 250 and 251 to drive pins 253 and 254 into the drywall may be a manual function performed by the user, or in some embodiments may be automated by the user selecting one of buttons 215, for example, which may cause an electrically-operated pin driver mechanism, for example, to drive pins 253 and 254 into the drywall. Control means for retracting pins 253 and 254 from the drywall may also be manual or automated in various embodiments without departing from the scope and spirit of the invention. Other alternative embodiments of the present invention may utilize locator pins which permanently protrude somewhat from the bottom of modules 206/207, and securing template system 201 to the drywall may be achieved by simply pressing template system 201 into the drywall after proper location and angle as indicated, thereby urging the locator pins on the back of template system 201 into the drywall, preferably at a slight downward angle.

In a preferred embodiment, once template system 201 is properly positioned and secured to the drywall utilizing the locating pin mechanisms 250 and 251, the user then utilizes a cutting tool, whose cutting bit has a dimension less than the width of the rectangular slot following the outline of the cutout, to make the cut in the drywall following the guide provided by the rectangular slot in template 202. The cutting bit, attached to the tool, is adjusted for the proper depth-of-cut according to the thickness of the drywall, and is inserted into the rectangular slot following the outline of the cutout. The user then makes the required cut in the drywall by following the guide provided by the rectangular slot in template 202 along the entire periphery of the outline. Once the cutting is complete, the user then removes template system 201 from the drywall, leaving a cut out section, which is removed to form the desired opening. The cut out section remains in place within the opening, supported only by a small section of drywall which was not cut caused by lifting of the cutting tool out of the slot guide and over support bridges 242 of module 206, and bridges 243 of module 207. The user may then simply perform a small cut with a drywall saw or other hand-held cutting utensil, at the four bridge locations to remove the cut out section to form the opening, or simply remove the cut out section by gently tapping on the surface to break the small drywall bridges that remain.

FIG. 2B is an end view of template system 201 of FIG. 2A. In this view the right side of module 206 template system 201 is shown, with extension arm 223a extending outward. Buttons 215, rotary knob 211 and display 209 of module 206 are also visible on the upper surface of module system 201. Emitter/receiver elements 219 are also visible on the side and top and bottom of module 206. Locator pin mechanism 251 is more clearly illustrated in this view, with a retractable pin 253 in the extended position protruding slightly below the level of the bottom surface of template 201, at a slight downward angle as described above with reference to FIG. 2A.

FIG. 2C is a top view of template system 201 of FIG. 2A, and the drywall of FIG. 1. The top of both modules 206 and 207 are visible in this view, as are emitter/receiver elements 219 and buttons 215 and rotary knobs 211 on the upper surface of modules 206 and 207. Locator pin mechanisms 250 and 251 are also clearly seen in the view, with locator pins 253 and 254 in the extended position protruding slightly into drywall 11, securing template 201 in its position on the upper surface of drywall 11. Extension arms 231a and 239a are shown in their assembled position, the end of extension arm 239a extending slightly into the end of extension 231a.

Figure 2D:
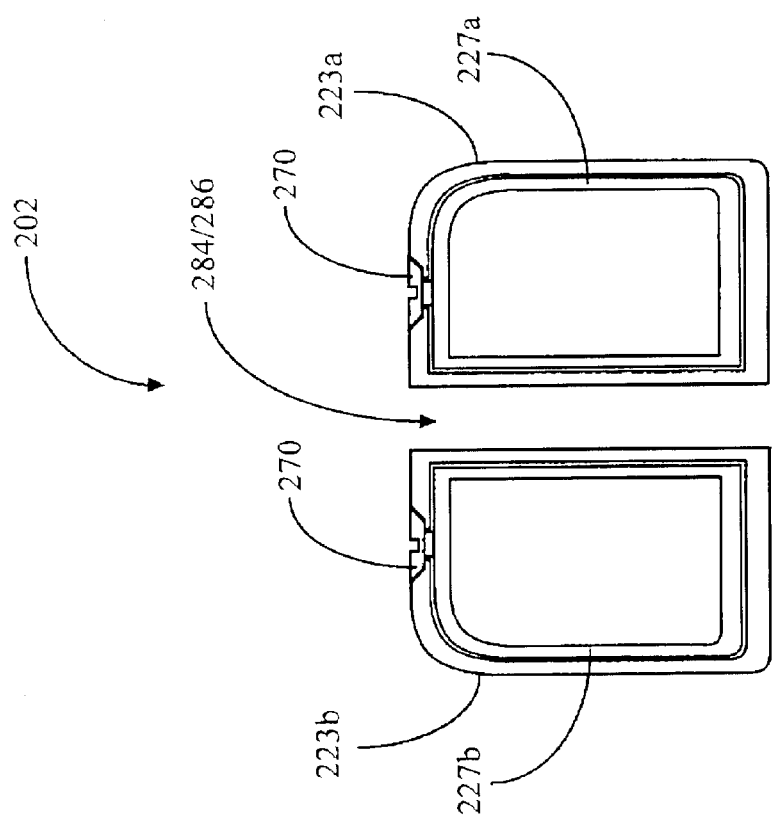
FIG. 2D is an end view of a cross-section of two assembled extension arms taken along line D—D of the template system of FIG. 2A.

FIG. 2D is an end view of a crossection of assembled extension arms to 223 and 227 taken along line D—D of the template system of FIG. 2A. The tubular nature and shape of both extension arms 223 and 227 is clearly depicted in this view, extension arms 227 having slightly smaller dimensions than extension arms 223, allowing for the ends of extension arms 227 to neatly slide into the ends of extension arms 223 as shown. Extension arms 227 are secured within extension arms 223 by tightening of screws 270 through extension arms 223, urging the ends of screws 270 into the upper surface of extension arms 227, thereby preventing extension arms 227 from sliding back and forth within extension arms 223. Slot 284 formed between extension arms 223a/b, and slot 286 of extension arms 227a/b, as shown in FIG. 2A, combine in this view to provide slot 284/286 between the assembled extension arms 223 and 227 enabling a bit of a drywall cutting tool to extend downward, completely through slot 284/286 and protrude far enough below the bottom surface of extension arms 223 sufficient for making the desired cutout in the wall covering.

Figure 3:
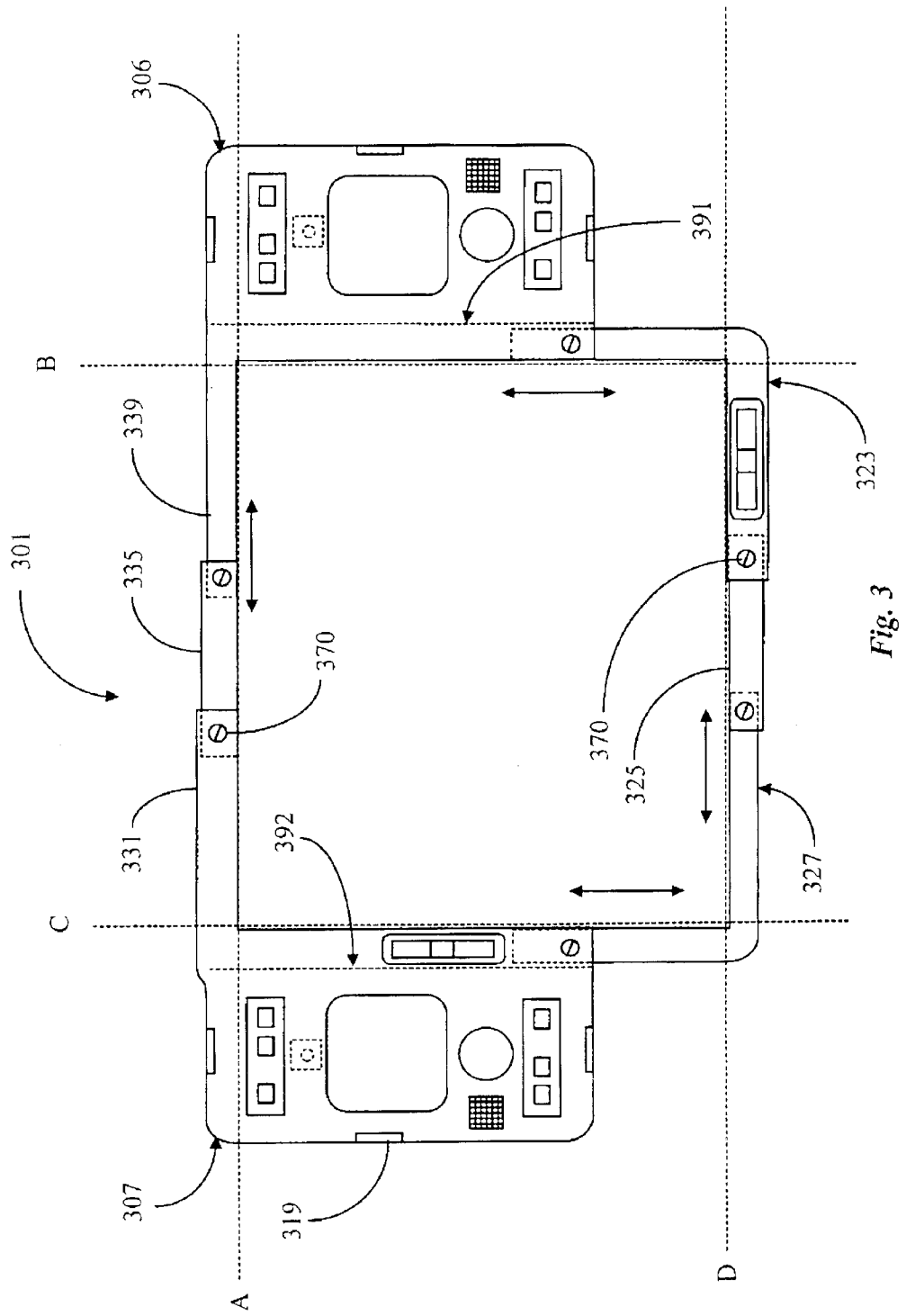
FIG. 3 is an elevation view of a template system according to an alternative embodiment of the present invention.

FIG. 3 is an elevation view of a template system according to an alternative embodiment of the present invention. Template system 301 provides an alternative method for following the outline for a cutout with a drywall cutting implement, such as a rotary drywall cutting tool as described with reference to FIG. 2A. Template system 301 comprises stud finder modules 306 and 307 which are functionally equivalent to modules 206/207 of the preferred embodiment described in FIG. 2A. Modules 306/307 are each provided with the same speaker and display, function control, emitter/receiver elements and locator pin anchoring systems and other elements for positioning and leveling template system 301, for cutting an opening in drywall along an outline defined by the area encompassed by lines A, B, C and D, similarly as described for template system 201 of FIG. 2A. Modules 306 and 307 also each have an extension arm protruding horizontally, inward from the top of each module, arm 339 from module 306 and arm 331 from module 307. In this embodiment, however, extension arms 339 and 331 are connected with a center sleeve 335 which is adapted on one end to slide into the end of arm 331, and on the opposite end to slide over the end of arm 339, in similar fashion the upper arms of template 201 of FIG. 2A. Template system 301 also has an L-shaped template extension 323, one end of which is inserted into track 391 of module 306, similarly as described for template 201, and a similar L-shaped extension 327 inserted into track 392 of module 307. A sleeve 325 connects extensions 327 and 323 similarly as for extensional arms 339 and 331, also secured in position by tightening screws 370.

The method used for following the outline for making the drywall cut differs in this embodiment however, in that, instead of following a slotted groove with the rotary drywall cutting tool or other cutting implement, as in template system 201 of FIG. 2A, the user follows along the inside edge of the outline formed by the assembled extension arms 339, 331, 323 and 327, and center elements 325 and 335, following the cutout outline defined by horizontal lines A and D, intersecting with vertical lines B and C, as shown in the view. The configuration of the extension arms and center connectors also extends the limits of adjustability for template system 301, allowing the user to accurately cut openings much larger than standard single or dual-gang openings.

Figure 4:
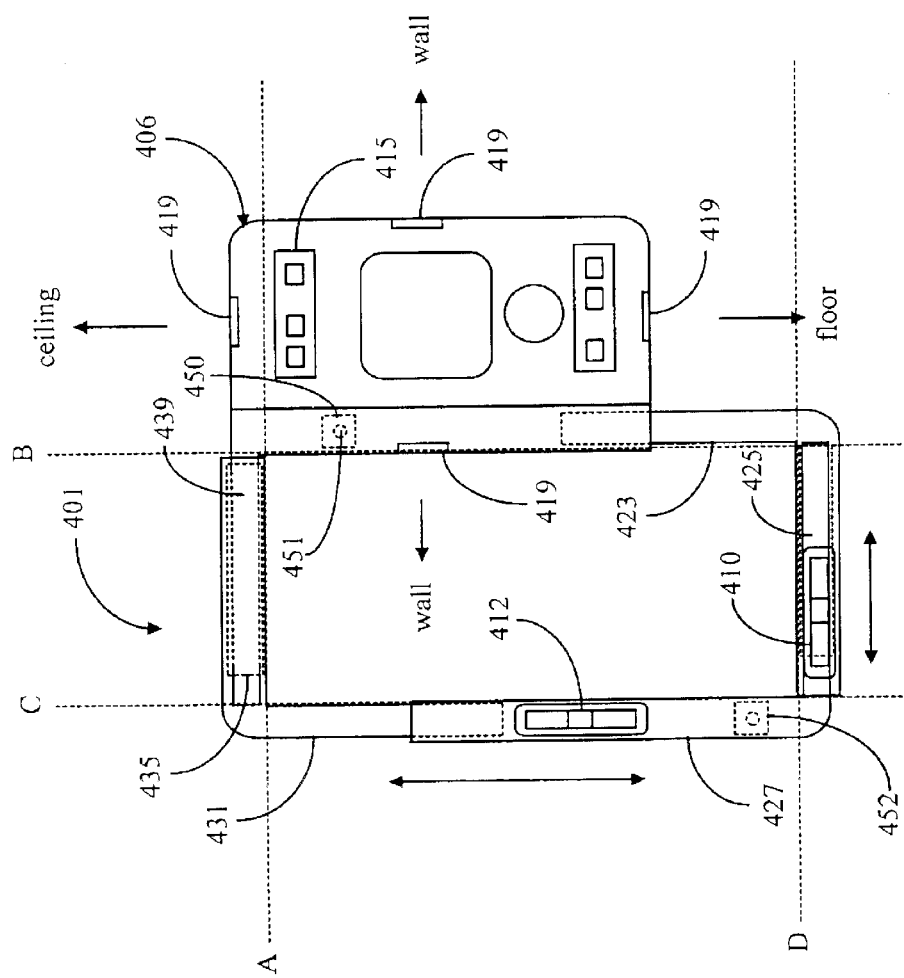
FIG. 4 is elevation view of a template system according to another alternative embodiment of the present invention.

FIG. 4 is elevation view of a template system according to another alternative embodiment of the present invention. Template system 401 differs from systems 201 of FIG. 2A and 301 of FIG. 3 in that only a single stud finder module 406 is utilized for locating the beginning reference point of an outline of a cutout to be made, and providing the squared and level guide along which the user follows with the cutting tool to make the cut. Module 406 is substantially equivalent to the modules of the preferred embodiment described in FIG. 2A in both form and functionality, sharing all of the elements as described for function control, display, laser distance measurement, leveling, and so on. Module 406, however, differs slightly in functionality from module 206 of FIG. 2A, in that, due to the single module design of system 401, added functionality is incorporated enabling the user to locate the starting reference point for the outline of a cut to be made, relative to a detected wall stud, the outline aligned with either side of the wall stud. For instance, if a user wishes to locate and cut an opening for installing a stud-mounted gang box which is to be secured to the left side of a stud, the user would utilize module 406 to locate the stud and identify the stud dimensions and outline, and using the distance measurement, leveling, audible/visual indicators and other functionality as described for the previous embodiments, the user would then position template system 401 on the drywall in the correct position, anchor with the locator pin mechanisms 451 and 452, and proceed to make the cut with a rotary drywall cutting tool for example, following the guideline provided by the template system. On the other hand, if the user wishes to cut the opening for installing a gang box on the right side of the stud, the user would then invert system 401 such that the template portion of system 401 is positioned to the right of module 406. Intelligence within module 406 would then, either automatically of by the user invoking a command with one of buttons 415, for instance, consider the inverted position of the system, and still correctly indicate to the user when the proper distance from the floor, angle and alignment with the wall stud is achieved. The user is thereby enabled to utilize system 401 for making level, squared openings in drywall, regardless of whether the opening will be to the left or right of the wall stud.

Template system 401 utilizes the template elements similar to those described for module 301 of system 301 of FIG. 3, having an extension arm 439 extending horizontally from the top of module 406, with a center extension 435 sliding over arm 439. In the absence of a second equivalent module as in the previous embodiments described, L-shaped extensions 427 and 431 are provided to form the left portions of the template. The end of the upper portion of extension 431 is adapted to slide over center extension 435, and the same is true for the lower arm 427 and center extension 425. Template 401 is shown in this view adjusted to the outline dimensions of a single-gang opening, and may also be secured in position utilizing screws such as previously described, or some other securing means.

As with system 301 of FIG. 3, the inner surfaces of the extension elements of template system 401, forming the rectangular outline defined by lines A, B, C and D, provide the guide for making the cut in the drywall, the user following the outline with the cutting tool while slightly urging the tool outwardly in order to prevent wandering of the cutting tool. Locator pin mechanisms 450 and 452 are equivalent in form and function to those of previously described embodiments, and are similarly employed by the user to project a pin slightly into the surface of the drywall, at a slightly downward angle, for anchoring both sides of the template system to the drywall once it is placed in the correct position for cutting the opening along the determined outline.

FIG. 5A is an elevation view of a template system module according to another alternative embodiment of the present invention. Module 501 is provided in this embodiment, as a standalone unit which, when used with other like modules and template elements in a template system which will be subsequently described, allows the user to accurately locate the outline for making a large cut in drywall, relative to the location of a hidden wall stud, wherein the size of the opening is much larger than possible with the previous embodiments disclosed above.

Module 501 contains stud-sensing circuitry according to known technology, preferably utilizing the latest mini-radar sensing technology for accurately reading the exact dimensions and location of the framing stud. In this respect module 501 is functionally equivalent to module 206 of FIG. 2A.

Module 506 also has a display 509 utilizing known display technology such as LCD, for providing the user with visible readings, information and possibly graphics pertaining to the operation and positioning of module 506, and a speaker 512 for providing the user with various audible indicators. Buttons 515 are provided for executing the various functions of module 506, which is further described below, and for selecting display of various information and settings pertaining to the modules' operation and function. Levels 510 and 512 provide the leveling capability of the unit, as with previously described embodiments.

Module 506 is also provided with a plurality of emitter/receiver elements 519, one element 519 located on each of the top, bottom, left and right sides of module 506. Elements 519 are connected to circuitry and processor (not shown) within module 506 enabled for emitting, receiving, reading and processing laser signals. Elements 519 are enabled as in previously described embodiments for laser distance measurement utilizing known technology that is suitable for measuring the distance between, for example, the distance between module 506 and a wall, ceiling, floor, or another module 506. The functions of each of elements 519 are separately programmable through activation of one or more of buttons 515.

Locator pin mechanisms 550 and 551 and pins 552 and 553, which are also similar to those used in module 206 of FIG. 2A, are also provided in this embodiment for the purpose of anchoring module 506 in its held position over a wall stud after proper location and alignment has been achieved. Activation of pin mechanisms to 550 and 551 to drive pins 552 and 553 into the drywall may be a manual function performed by the user, or may be automated by the user selecting one of buttons 215, for example, which cause the pin driver mechanism to drive pins 552 and 553 slightly into the drywall, at a downward angle. Control means for retracting pins 553 and 554 from the drywall may also be manual or automated without departing from the scope and spirit of the invention.

Module 506 is provided with a rotating mounting apparatus 560, which rotates freely within module 506, and contains two pairs of small slots 563 extending from the surface downward into apparatus 560. Apparatus 560 is provided for attaching the end of a template element as is further detailed below.

FIG. 5B is a side view of template system module 506 of FIG. 5A. In this view the flat profile of module 506 is apparent, clearly showing emitter/receiver elements 519, display 509, and pin mechanisms 550/551 and pins 552/553 in the extended position, protruding slightly below the bottom surface of module 506. Rotating mounting element 560 is shown with slots 563 extending slightly down into element 560.

Figure 6:
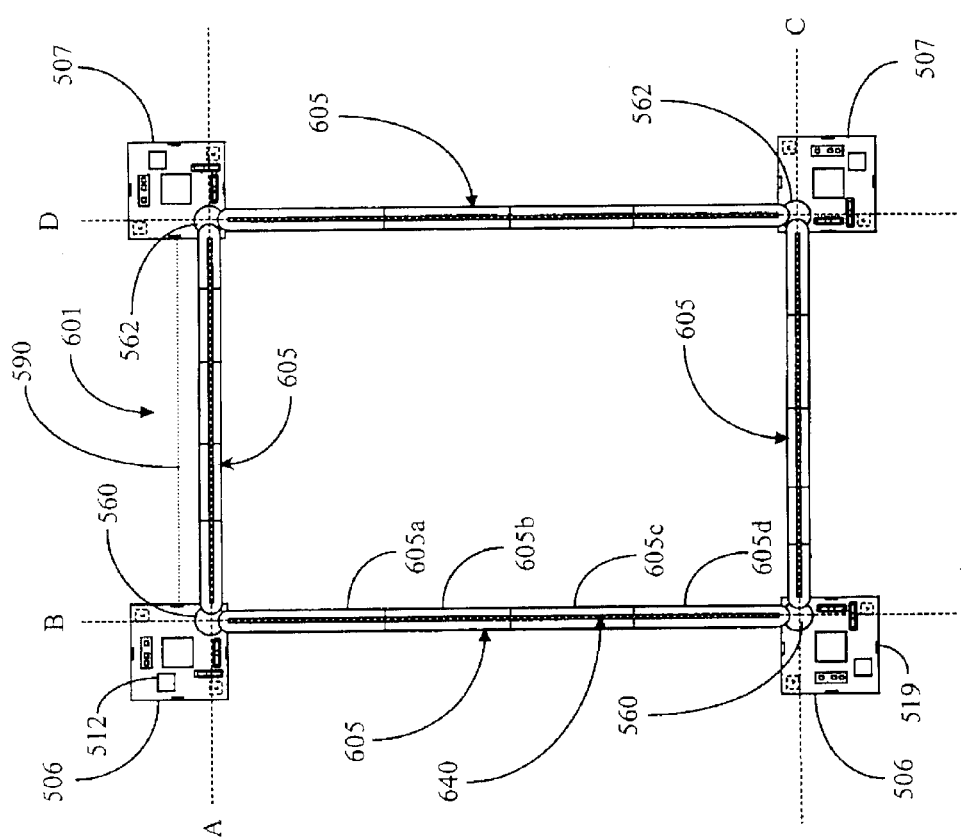
FIG. 6 is an elevation view of a plurality of template system modules of FIG. 5A, interconnected with template guide rails according to an embodiment of the present invention.

FIG. 6 is an elevation view of a plurality of template system modules 506 of FIG. 5A, interconnected with template guide rails according to an embodiment of the present invention. Template system 60, as will be described, allows the user to accurately locate the outline for making a large cut in drywall, relative to the location of a hidden wall stud, wherein the size of the opening is much larger than possible with the previous embodiments disclosed above.

An example of an application where system 601 might be used is for making a level and perfectly squared opening in a wall covered with drywall, for installing a recessed medicine cabinet, for instance, into a wall, wherein it is necessary for both the left and right sides of the opening to be aligned with wall studs such that the medicine cabinet may be attached directly to the studs.

Template system 601 comprises a pair of modules 506 and a pair of modules 507, modules 506 located at the top left and bottom left corners of a rectangle, modules 507 being located at the top and bottom corners at the right of the rectangle. Modules 506 and 507 are physically and functionally equivalent to each other, with the exception that modules 507 differ slightly from modules 506 in that the arrangement of all of the elements on the surface of modules 507 is opposite to that of modules 506, allowing for arranging them in a pattern as shown for making the large cut. For instance, module 506 has the rotating element 560 located in the lower right corner, and module 507 has an equivalent rotating element 562 located in the lower right corner.

A set of four adjustable template guide rails 605 are provided in this embodiment, for the purpose of providing the guide along which the user will follow with a rotary drywall-cutting tool, for example, when making a cut. Guide rails 605 each comprise multiple sections 605a-d which are adapted for one section to slide back and forth within another, similarly to the adjustable template systems previously described. Sections 605a and 605d are each adapted on one end, as shown later in greater detail, to attach to the rotating elements 560 or 562 of modules 506 and 507, such that one guide rail 605 may span and interconnect a pair of modules 506 or 507, as shown in the figure.

Each of center sections 605b and 605c have a slot 640 spanning the entire length of the section and extending completely through, and each of end sections 605a and 605d have a similar slot, except that instead of extending the entire length, the slot terminates close to the end which is attached to rotating elements 560/562 of modules 506/507.

In practice of the embodiment shown by FIG. 6, the example shows the outline of a large cutout to be made, represented by the area encompassed by intersecting lines A, B, C and D. The cutout to be made in this example spans horizontally from one hidden wall stud (not shown) to another. The user will first locate the wall stud, which will border the left of the outline, utilizing the stud sensor functionality of a first module 506. Distance measurement functionality in module 506 as described enables placement of module 506 at the desired height from the floor. Once module 506 is aligned with the hidden wall stud and at the proper height, module 506 is leveled using levels 510 and 512, and then locator pin mechanisms 550 and 551 are activated to anchor module 506 in its proper location to the surface of the drywall.

With the first module now in place at the upper left corner of the proposed cutout, and perfectly leveled to plumb, the remaining three modules of the system may be positioned. As previously mentioned, module 506 is enabled for laser distance measurement utilizing circuitry and functionality within module 506, and emitter/receiver elements 519 located on each of the four sides of module 506. In this embodiment, however, modules 506 and 507 are also enabled for emitting a laser beam through any of elements 519, and are also capable of reading an emitted laser beam from any other module 506 or 507.

For locating and placing the second module in the system (module 507, top right), the user will first locate the hidden wall stud which will border the right side of the proposed cutout, utilizing the stud sensing functionality of module 507. Once the proper position for module 507 is determined relative to the right-side wall stud, the user will then activate such as one of buttons 515 of module 506, to emit a visible laser beam 590 horizontally from an element 519 on the side of module 506, towards the second module (507). Since the first module (506) is now positioned at the upper left corner of the proposed cutout, and is anchored to the drywall perfectly squared to a horizontal line, the laser beam 590 is emitted from module 506 following a perfectly horizontal line. Elements 519 of modules 506 and 507 are also enabled for detecting such an emitted laser beam from another module, and the second module (507) which will be placed at the upper right of the outline detects, through an element 519 on the side of module 507 facing module 507, the emitted laser beam from module 506, and when module 507 is aligned horizontally with module 506, thereby indicating the correct height for module 507, module 507 provides a visible/audible indicator to the user that such horizontal alignment has been achieved. Leveling functionality in module 507 enables the user now to position module 507 perfectly squared to module 506.

With module 507 now in place at the upper right corner of the proposed outline, the user will activate locator pin mechanisms as in module 506 to anchor module 507 to the drywall in its correct position. A first guide rail 605 is then connected at one end to rotating element 560 of module 506, and extended to, and connected at the other end to rotating element 562 of module 507, thereby providing a guide for making the first cut along the top horizontal line of the outline.

The third module (507), which will be placed at the lower right of the outline, is then positioned according to the location of the hidden wall stud utilizing the stud sensing technology, leveled using the leveling functionality and positioned in place at the proper distance from the second upper-right module (507) utilizing the distance measurement functionality.

The third module 507 may also be vertically aligned with the second module 507 by detecting a laser beam emitted from the second module 507, similarly to the horizontal leveling described above between modules 506 and 507.

After correct positioning of the third module (507) pin locator mechanisms are activated in module 507, thereby anchoring module 507 in its correct position on the drywall surface, at the bottom right corner of the proposed outline. A second guide rail 605 is then attached on one end to the rotating element 562 of the upper-right module 507, and extended down vertically to module 507 and attached to rotating element 562 of the third module (507). The user may then activate such as one of buttons 515 of the lower-right module 507 to emit a perfectly horizontal laser beam to the left for aligning a fourth module (506 lower-left) such that the fourth module may be correctly positioned relative to the remaining three modules, which have already been located, squared and anchored to the drywall. The fourth module is then anchored at the lower left corner of the outline utilizing pin locator mechanisms as described, and one end of a third guide rail 605 is then attached to rotating element 562, the other end extended towards the fourth module 506, and attached to rotating element 560 of the final module 506. Once modules 506 and 507 have been positioned and anchored, and all guide rails 605 have been attached at both end to modules 506/507, a squared and level template is thereby provided for cutting a large opening between two wall studs, wherein the user follows the guide provided by slot 640 of guide rails 605 with the cutting tool around the entire outline completing the rectangle.

Figure 7A:
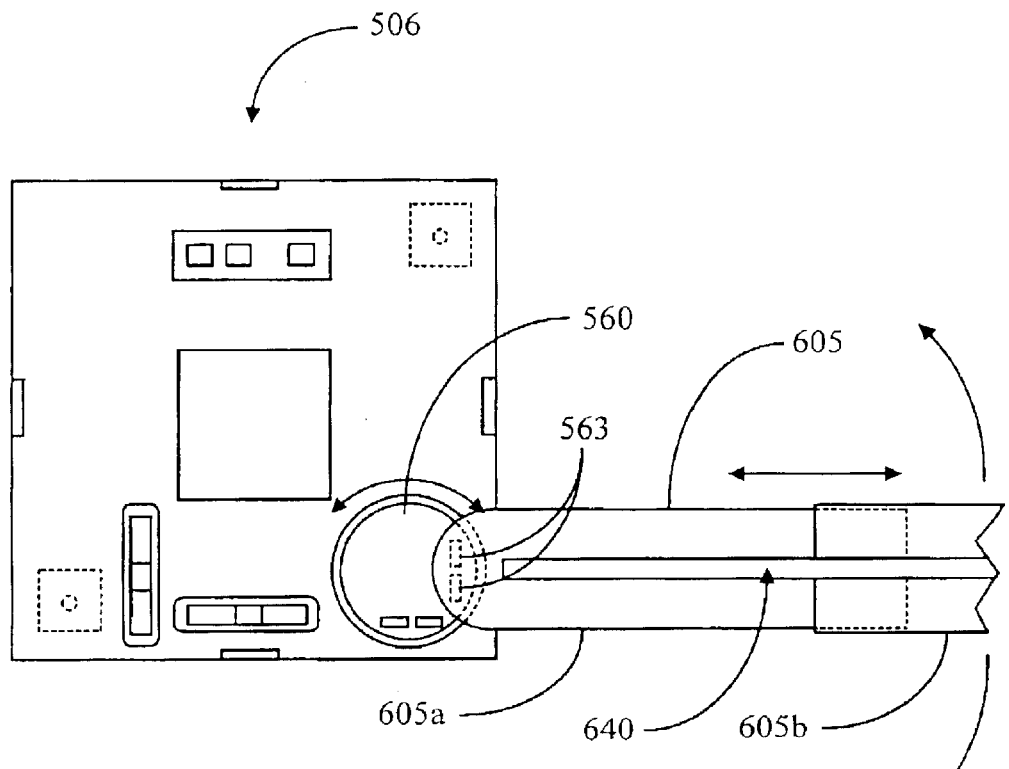
FIG. 7A is an elevation view of a template system module and portion of a template guide rail of FIG. 6, enlarged to show greater detail.

FIG. 7A is an elevation view of a template system module and portion of a template guide rail of FIG. 6, enlarged to show greater detail. In order to avoid redundancy, elements shown in this view, which have been previously described, will not be repeated in this example. Greater detail is given in this enlarged view of the attachment of one end of guide rail 605 to rotating member 560 of module 506. The round end of section 605a can be seen positioned over a pair of slots 563 in rotating member 560 of module 506, the other end inserted into the end of section 605b, as previously described, enabling adjustability of guide rail 605. Once guide rail 605 is attached in rotating member 560, guide rail 605 may be rotated at various angles such that large, odd-shaped cutouts may be made by anchoring module 506 to the drywall as described, and then repositioning additional modules 506 or 507 to form a new outline.

Figure 7B:
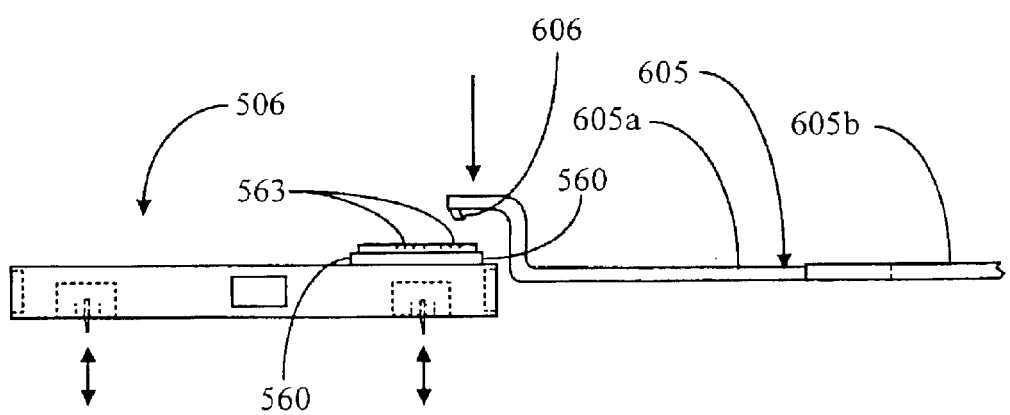
FIG. 7B is a side view of the template system module and portion of template guide rail of FIG. 7A.

FIG. 7B is a side view of the template system module 506 and portion of template guide rail 605 of FIG. 7A. In this view detail is shown of the method for attachment of the end of guide rail 605 to rotating member 560 of module 506. The side view of guide rail 605 illustrates an offset bend at the end of guide rail 605, which enables the bottom surface of guide rail 605 to be flush with the bottom surface of module 506 when guide rail 605 is attached to the top of element 560.

At the end of guard rail 605 which attaches to element 560 as shown, a pair of hooks 606 are provided, (one of which is shown in this view) at the end on the lower service, protruding down from the bottom surface of the attaching end of guide rail 605, and slightly angled inward. Hooks 606 enable the end of guide rail 605 to be attached to rotating element 560, by inserting hooks 606 into a pair of slots 563. Guide rail 605 may then be rotated freely on module 506 enabling the formation different shapes of outlines with the template system having angles other than 90 degrees.

Although the present invention has been described in the various embodiments above to be adapted for use in locating and cutting rectangular shaped openings in "old work" gang box installation applications, and for locating and cutting other larger openings in drywall or other such wall covering, the present invention may be adapted for providing a guide for cutting openings of a variety of sizes and shapes, which may or may not be necessarily aligned with a wall stud. For example, template module systems according to the present invention may be used for cutting openings which are located on the wall based only on the measured distance between the module and a wall, floor or ceiling, as detected by the distance measuring functionality of the module as described. Furthermore, adjustable template systems integrated with modules as described above, or adjustable guide rails for use with separate modular units, such as described in FIGS. 6 and 7, may be adapted to provide a guide for a cutting tool other than the rotary cutting tool as described above for the various embodiments, such as a hand-held drywall saw, jigsaw or other common drywall cutting implement, without departing from the scope and spirit of the invention. Still further, the functionality for distance measurement, leveling, and intercommunication between modules of a template system may utilize various known technologies enabling the functionality, and should not be limited only those technologies herein disclosed. Therefore, the present invention described in terms of the preferred or alternative embodiments is defined by the claims that follow, and not limited by the particular embodiments herein described in detail.

What is claimed is:

1. A template system for guiding a cutting tool to make a cutout in drywall, comprising:

an adjustable template defining a rectangular shape having a height and a width, the template having upper and lower horizontal portions and left and right vertical portions, the portions slidably engaged such that the vertical and horizontal dimensions may be adjusted to adjust the height and width of the template;

a first control box affixed to the left of the left vertical portion and incorporating a first stud finder;

a second control box affixed to the right of the right vertical portion and incorporating a second stud finder;

an optical sensor system in one of the control boxes for sensing the height of the template system from a floor;

an input mechanism for a user to enter a standard height from the floor for use by the optical sensor system; and an alert mechanism for alerting the user when the template system is positioned at the standard height from the floor;

characterized in the control boxes include circuitry and functionality for communicating with one another and, with the template system positioned against a drywall, the control boxes track the position of their respective vertical portion and state of said stud finder and communicate the positions and states with one another to acquire a predetermined geometric shape.

2. The template system of claim 1 wherein the studfinders incorporates a radar subsystem to locate a stud.

3. The template system of claim 1 comprising lock/unlock mechanisms to fix template height and width after adjustment.

4. The template system of claim 1 wherein one of the control boxes further incorporates template size sensors to sense the adjustable template height and width.

5. The template system of claim 4 comprising an input mechanism for a user to enter a standard template height an width for use by the template size sensors; and an alert mechanism for alerting the user when the template height and width equal the standard template height and width.

6. The template system of claim 5 wherein the alert mechanism is one or both of an audio alert or a light.

7. The template system of claim 4 wherein one of the control boxes comprises a display, and displays the sensed template height and width.

8. The template system of claim 1 further comprising a level indicator system for indicating to a user when one or more portions of the interconnecting portions are level or plumb.

9. The template system of claim 1 further comprising a mounting system for temporarily mounting the template system to a drywall.

* * * * *